United States Patent
Liu et al.

(10) Patent No.: US 11,221,766 B2
(45) Date of Patent: Jan. 11, 2022

(54) SYSTEM AND METHOD FOR PERSISTENT MEMORY ROTATION BASED ON REMAINING WRITE ENDURANCE

(71) Applicant: DELL PRODUCTS, LP, Round Rock, TX (US)

(72) Inventors: Wei Liu, Austin, TX (US); Ching-Lung Chao, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 74 days.

(21) Appl. No.: 16/422,033

(22) Filed: May 24, 2019

(65) Prior Publication Data

US 2020/0371694 A1    Nov. 26, 2020

(51) Int. Cl.
*G06F 3/06* (2006.01)
*G06F 11/22* (2006.01)
*G06F 13/20* (2006.01)

(52) U.S. Cl.
CPC .......... *G06F 3/0616* (2013.01); *G06F 3/0647* (2013.01); *G06F 3/0659* (2013.01); *G06F 3/0679* (2013.01); *G06F 11/2284* (2013.01); *G06F 13/20* (2013.01)

(58) Field of Classification Search
CPC .... G06F 3/0616; G06F 3/0659; G06F 3/0679; G06F 3/0647; G06F 11/2284; G06F 13/20; G06F 12/0246
See application file for complete search history.

(56) References Cited

U.S. PATENT DOCUMENTS

| | | | |
|---|---|---|---|
| 6,249,838 B1 * | 6/2001 | Kon | G06F 12/0246 365/185.33 |
| 9,405,478 B2 * | 8/2016 | Koseki | G06F 3/0665 |
| 10,095,438 B2 | 10/2018 | Berke et al. | |
| 10,152,264 B1 * | 12/2018 | Butcher | G06F 3/0646 |
| 10,275,162 B2 | 4/2019 | Kan et al. | |
| 2004/0193701 A1 * | 9/2004 | Michaelis | G06F 15/177 709/220 |
| 2014/0201576 A1 * | 7/2014 | Wu | G06F 11/2094 714/47.2 |
| 2014/0317373 A1 * | 10/2014 | Kim | G06F 11/004 711/167 |
| 2017/0185293 A1 * | 6/2017 | Malikowski | G06F 12/0246 |
| 2017/0285970 A1 | 10/2017 | Li et al. | |
| 2018/0314441 A1 * | 11/2018 | Suryanarayana | G06F 3/065 |

* cited by examiner

Primary Examiner — Tasnima Matin
(74) Attorney, Agent, or Firm — Larson Newman, LLP

(57) ABSTRACT

During a power-on self-test (POST), the BIOS of an information handling system may read a percentage remaining of a persistent memory device. If the percentage remaining satisfies a threshold, the BIOS may provide a message recommending that the persistent memory device be replaced, or automatically swapping the namespaces between two sets of persistent memory devices based on the write endurance remaining threshold.

20 Claims, 11 Drawing Sheets

| Persistent Memory Device 702 | Memory Mode 704 | Percentage Remaining 706 | Slot Location 708 | Interleave Set 710 | Namespace 712 |
|---|---|---|---|---|---|
| Persistent Memory Device 604 | AppDirect | 100 | 1 | | |
| Persistent Memory Device 606 | AppDirect | 3 | 2 | | Namespace 640<br>Namespace 642 |
| Persistent Memory Device 608 | AppDirect | 80 | 3 | | Namespace 644 |

SYSTEM AND METHOD FOR PERSISTENT MEMORY ROTATION BASED ON REMAINING WRITE ENDURANCE

FIELD OF THE DISCLOSURE

The present disclosure generally relates to information handling systems, and more particularly relates to rotating persistent memories based on write endurance remaining.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a basic input/output system (BIOS) that begins a power-on self-test (POST) of the information handling system. During the POST, the BIOS may read a percentage remaining of a flash write endurance of each of a plurality of persistent memory devices, including a first percentage remaining of a first persistent memory device and a second percentage remaining of a second persistent memory device. The BIOS determines whether the first percentage remaining satisfies a threshold percentage. In response to the first percentage remaining satisfying the threshold percentage, the BIOS determines all persistent memory devices in a first interleave set with the first persistent memory device. The BIOS determines a second interleave set with an equal number of persistent memory devices and with a same amount of total memory capacity as the first interleave set. Each percentage remaining of each persistent memory device within the second interleave set exceeds the first percentage remaining of the first persistent memory device. The BIOS can either copy all namespaces from the first interleave set to the second interleave set, or swap all namespaces between the first interleave set and the second interleave set. The BIOS erases the namespaces from the first interleave set. The BIOS provides a message recommending that the first persistent memory device be replaced.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
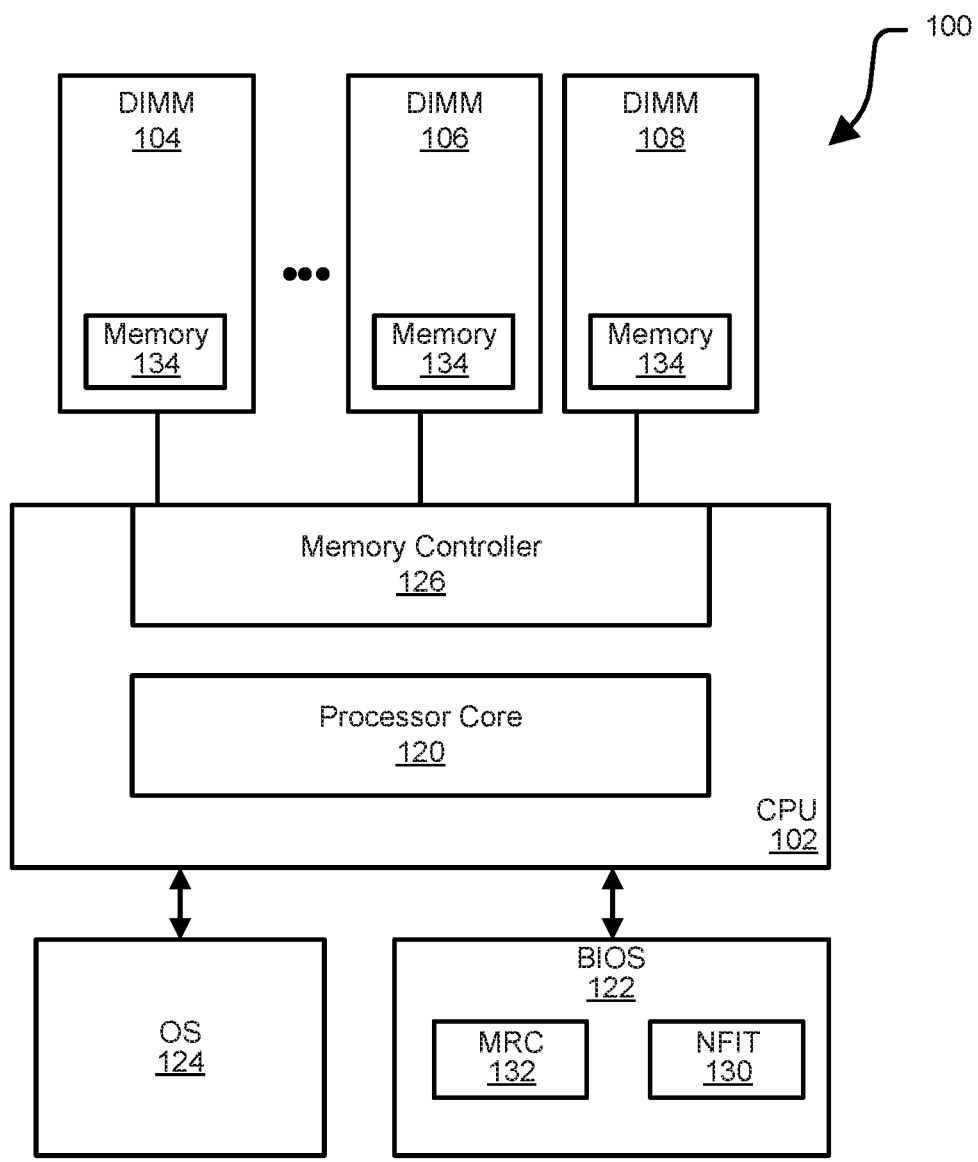
FIG. 1 is a block diagram of a portion of an information handling system according to at least one embodiment of the disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

An information handling system to rotate persistent memories based on write endurance percent left is disclosed herein. The information handling system may include a plurality of persistent memory devices and a basic input/output system (BIOS). The BIOS may begin a power-on self-test (POST) of the information handling system. During the POST, the BIOS may read a percentage remaining of a flash write endurance of each of a plurality of persistent memory devices, including a first percentage remaining of a first persistent memory device and a second percentage remaining of a second persistent memory device. The BIOS determines whether the first percentage remaining satisfies a threshold percentage. In response to the first percentage remaining satisfying the threshold percentage, the BIOS determines all persistent memory devices in a first interleave set with the first persistent memory device. The BIOS determines a second interleave set with an equal number of persistent memory devices and with a same amount of total memory capacity as the first interleave set. The BIOS also determines that each percentage remaining of each persistent memory device within the second interleave set exceeds the first percentage remaining of the first persistent memory device. The BIOS can either copy all namespaces from the first interleave set to the second interleave set, or the BIOS can swap all namespaces between the first interleave set and the second interleave set. When BIOS copies all namespaces from the first interleave set to the second interleave set, the BIOS may erase the namespaces from the first interleave set. In an example, the BIOS provides a first message recommending that the first persistent memory device is replaced with the second persistent memory device with the second percentage remaining of the flash write endurance not satisfying the threshold percentage.

The information handling system disclosed herein to rotate persistent memories based on write endurance percent left provides various advantages and benefits over other systems that utilize persistent memories for data storage. In particular, during a UEFI boot process of the information handling system, the BIOS monitors the write endurance percentage remaining for each persistent memory device within the information handling system to determine whether the write endurance percentage remaining for a persistent memory satisfies a threshold. In an example, the write endurance percentage remaining may satisfy the threshold by being below a predetermined percentage. In response to the write endurance percentage remaining for a particular persistent memory satisfying the threshold, the BIOS may cause an automatic migration or swapping of namespaces within the particular persistent memory to another persistent memory with a higher write endurance percentage remaining. The BIOS may also recommend that an individual swap the particular persistent memory with another persistent memory device. These operations by the BIOS in the disclosed system enable notification and replacement of persistent memory devices before the write endurance percentage remaining of the persistent memory devices reaches zero and data is lost. Previous information handling systems merely provided a warning message that the write endurance percentage remaining of a persistent memory device is approaching zero without recommending the swapping of the persistent memory device with another, much less automatically migrating namespaces on the persistent memory device with a low write endurance percentage remaining to a persistent memory device is a higher write endurance percentage remaining. Therefore, the systems disclosed herein improve an information handling system by increasing functionality of persistent memory devices and preventing data loss.

FIG. 1 shows a portion of an information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

The information handling system 100 includes a CPU or processor 102 and dual in-line memory modules (DIMMs) 104, 106, and 108. In an embodiment, information handling system 100 may include additional components, not shown in or discussed with reference to FIG. 1, without varying from the scope of this disclosure. In an embodiment, the information handling system 100 can be a server, a personal computer, a laptop computer, or the like. The CPU 102 includes a processor core 120 and a memory controller 126. In an embodiment, CPU 102 may include additional components, not shown in or discussed with reference to FIG. 1, without varying from the scope of this disclosure. CPU 102 may execute a basic input/output system (BIOS) 122, and upon completion of the BIOS 122 may execute an operating system (OS) 124. BIOS 122 is firmware utilized during a boot process, such as a power-on self-test (POST), to initialize the hardware components within information handling system 100. In an embodiment, the hardware components within information handling system 100 initialized by BIOS 122 may include, but are not limited to, CPU 102 and DIMMs 104, 106, and 108. BIOS 122 may also provide runtime services for the OS 124 and other programs with CPU 102. BIOS 122 may include a non-volatile dual in-line memory module (NVDIMM) firmware interface table (NFIT) 130, and memory reference code (MRC) 132. In an embodiment, NFIT 130 can store information including, but not limited to, persistent memory ranges and properties for DIMMs 104, 106, and 108.

DIMMS 104, 106, and 108 may include one or more types of memory 134 accessible by CPU 102. For example, DIMMs 104, 106, and 108 may include dynamic random access memory (DRAM) and flash memory storage. In an embodiment, DIMMs 104, 106, and 108 may be implemented as one or more types of regular DIMMs with only volatile memory, or one or more types of non-volatile DIMMs (NVDIMMs). In an example, one or more types of NVDIMMs may include: NVDIMM-F including only persistent memory, such as flash storage, NVDIMM-N including both flash storage and DRAM on the same memory module, NVDIMM-P including persistent DRAM, and NVDIMM-X including NAND flash storage and DRAM on the same memory module. In this embodiment, DIMMs 104, 106, 108 may be Apache Pass (AEP) devices with memory 134 configured according to one of the memory types stated above, such as NVDIMM-F. One of ordinary skill in the art will recognize that while FIG. 1 illustrates DIMMs 104, 106, and 108, this disclosure is not limited to three DIMMs but can be applied to any number of DIMMs, as indicated by the ellipses in between DIMMs 104 and 106. In an embodiment, one or more of DIMMs 104, 106, and 108 may include additional components, not shown in or discussed with reference to FIG. 1, without varying from the scope of this disclosure.

CPU 102 may operate to provide data processing functionality of information handling system 100, such as is typically associated with an information handling system. As such, CPU 102 represents a data processing apparatus, such as one or more processor cores, and the associated data input and output (I/O) functionality, such as a chipset component, and other I/O processor components. CPU 102 operates to execute machine-executable code to perform the data processing tasks associated with information handling system 100.

BIOS 122 can be referred to as a firmware image, and the term BIOS is herein used interchangeably with the term firmware image, or simply firmware. BIOS 122 includes instructions executable by CPU 102 to initialize and test the hardware components of system 100, and to load a boot loader or OS 124 from a mass storage device. BIOS 122 additionally provides an abstraction layer for the hardware, i.e. a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

In an example, the BIOS 122 can be substantially compliant with one or more revisions of the unified extensible firmware interface (UEFI) specification. The UEFI standard replaces the antiquated personal computer BIOS system found in some older information handling systems. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the operating system. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that the disclosed systems and methods can be implemented at substantially any information handling system having configurable firmware.

Memory controller 126 represents a portion of a processor complex that is dedicated to the management of the data storage and retrieval from the memory devices of information handling system 100, and information handling system 100 may include one or more additional memory controllers similar to the memory controller 126, as needed or desired. Memory controller 126 may reside on a system printed circuit board, may be integrated into an I/O processor component, may be integrated with a processor on a system-on-a-chip (SoC), or may be implemented in another way, as needed or desired. Memory controller 126 operates to provide data and control interfaces to one or more DIMMs, such as DIMMs 104, 106, and 108, in accordance with a particular memory architecture. For example, memory controller 126 and the DIMMs 104, 106, and 108 may operate in accordance with a Double-Data Rate (DDR) standard, such as a JEDEC DDR4 or DDR5 standard.

In certain examples, before any usable memory 134 within DIMMs 104, 106, and 108 may be accessed by OS 124, BIOS 122 may perform a POST for information handling system 100. During the POST, BIOS 122 execute MRC 132 to access information associated with DIMMs 104, 106, and 108 and configure a memory address decode register for DIMMs 104, 106, and 108 as will be described herein. In an embodiment, the information associated with DIMMs 104, 106, and 108 stored within the memory address decode register may include, but is not limited to, a mode of operation for DIMMs 104, 106, and 108, and a total amount of memory for DIMMs 104, 106, and 108. The mode of operation can be an application-direct mode, a memory mode, a storage mode, or the like. In the application-direct mode, applications executed by processor core 120 via OS 124 can directly access data stored within DIMMs 104, 106, and 108. In the memory mode, a DRAM portion of DIMMs 104, 106, and 108 can be accessed by processor core 120 of CPU 102 to store data in DIMMs 104, 106, and 108. In the storage mode, data can be accessed in DIMMs 104, 106, and 108 in a block data format. These modes of operation can be set as attributes for DIMMs 104, 106, and 108 by the OS 124, by UEFI environment of BIOS 122, or the like. After the memory address decode register has been configured for DIMMs 104, 106, and 108 and other operations of POST have been completed, BIOS 122 may exit POST and processor core 120 may perform one or more runtime operations of OS 124.

Figure 2:
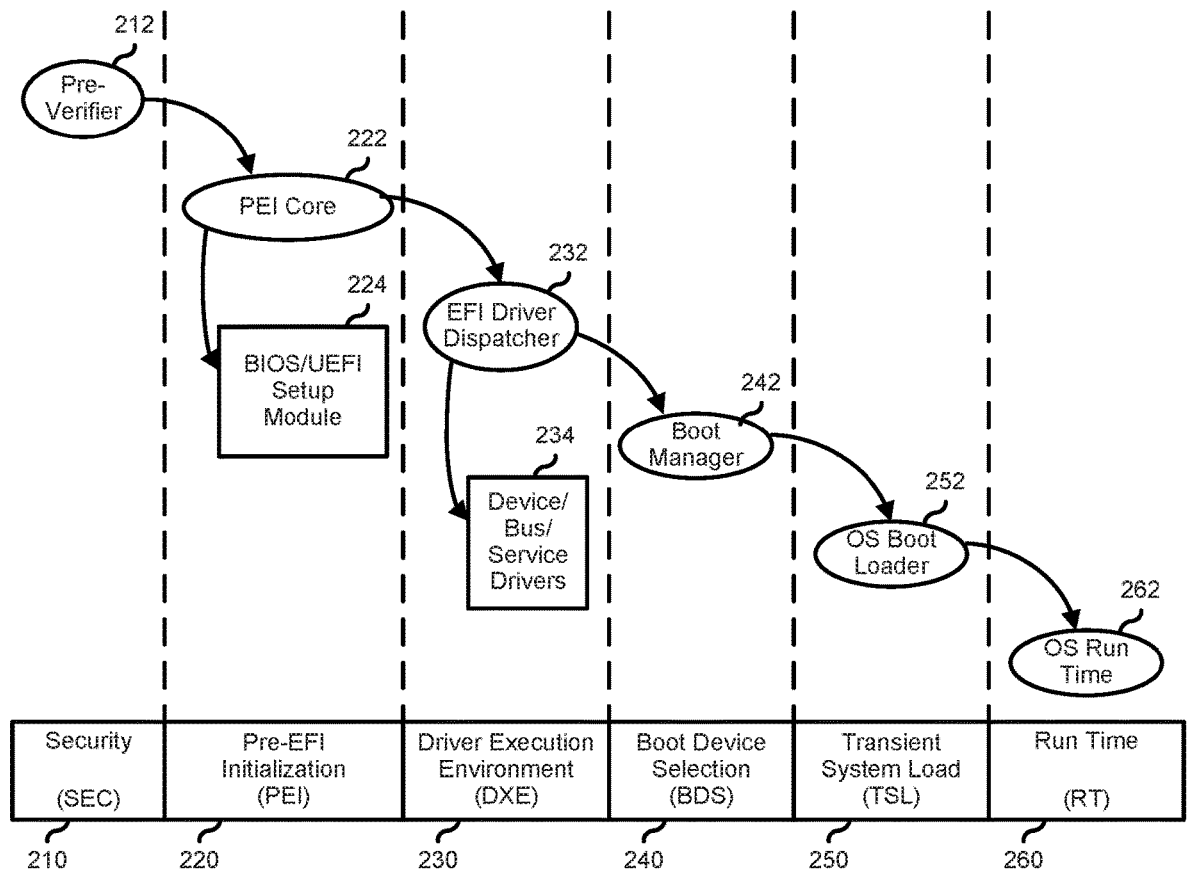
FIG. 2 is a phase diagram for a UEFI boot of the information handling system according to at least one embodiment of the disclosure.

FIG. 2 illustrates a phase diagram 200 for an information handling system that operates using a UEFI, including a security phase (SEC) 210, a pre-EFI initialization phase (PEI) 220, a driver execution environment phase (DXE) 230, a boot device selection phase (BDS) 240, a transient system load phase (TSL) 250, a run time phase (RT) 260, and an afterlife phase (AL) 270. SEC 210 is the first phase of a UEFI boot process on the information handling system that operates to set up a pre-verifier 212. Pre-verifier 212 handles all restart events on the information handling system, and temporarily allocates a portion of memory for use during the other boot phases. SEC 220 is executed out of the firmware resident on the information handling system, such as BIOS 152, and so serves as a root of trust for the system. SEC 210 passes execution to PEI 220 which initializes the system memory for the information handling system. PEI 220 includes CPU initialization 224, chipset initialization 226, and board resource initialization 228.

PEI 220 passes execution to DXE 230 which performs device specific initializations for the information handling system. In particular, DXE 230 executes an EFI driver dispatcher 232 that operates to load device, bus, and service drivers 234. DXE 230 passes execution to BDS 240 executes a boot manager 242 which identifies a boot target, and passes execution to TSL 250. TSL 250 launches an OS boot loader 252 which loads the operating system, and passes execution to the operating system 262 at RT 260.

Techniques disclosed herein are typically implemented during DXE 230, and utilize services provided by the UEFI specification, such as boot services. UEFI applications, including OS loaders, must use boot services functions to access devices and allocate memory. Services are defined by interface functions that may be used by code running in the UEFI environment. Such code may include protocols that manage device access or extend platform capability, as well as applications running in the pre-boot environment, and OS loaders. During boot, system resources are owned by the firmware and are controlled through boot services interface functions. All boot services functionality is available until an OS loader loads enough of its own environment to take control of the system's continued operation and then terminates boot services with a call to ExitBootServicesO.

One class of boot services includes protocol handler services, such as LoadImage, StartImage, InstallProtocolInterface, RegisterProtocolNotify, LocateProtocol, and numerous others. A protocol consists of a 128-bit globally unique identifier (GUID) and a Protocol Interface structure. The structure contains the functions and instance data that are used to access a device. The functions that make up Protocol Handler Services allow applications to install a protocol on a handle, identify the handles that support a given protocol, determine whether a handle supports a given protocol, and the like. LoadImage loads an image, such as a device driver, into system memory. StartImage transfers control to a loaded image's entry point. InstallProtocolInterface installs a protocol interface on a device handle. A driver can install multiple protocols. RegisterProtocolNotify registers an event that is to be signaled whenever an interface is installed for a specified protocol. LocateProtocol returns an array of handles that support a specified protocol. During DXE 230, boot services and runtime services can be started and a UEFI boot manager can load UEFI drivers and UEFI applications in an order defined by the global NVRAM variables. Driver initialization includes identifying a driver image that is stored on some type of media, such as at NVRAM 330 of FIG. 3. The techniques disclosed herein may implemented during any phase of the UEFI boot operation.

Figure 3:
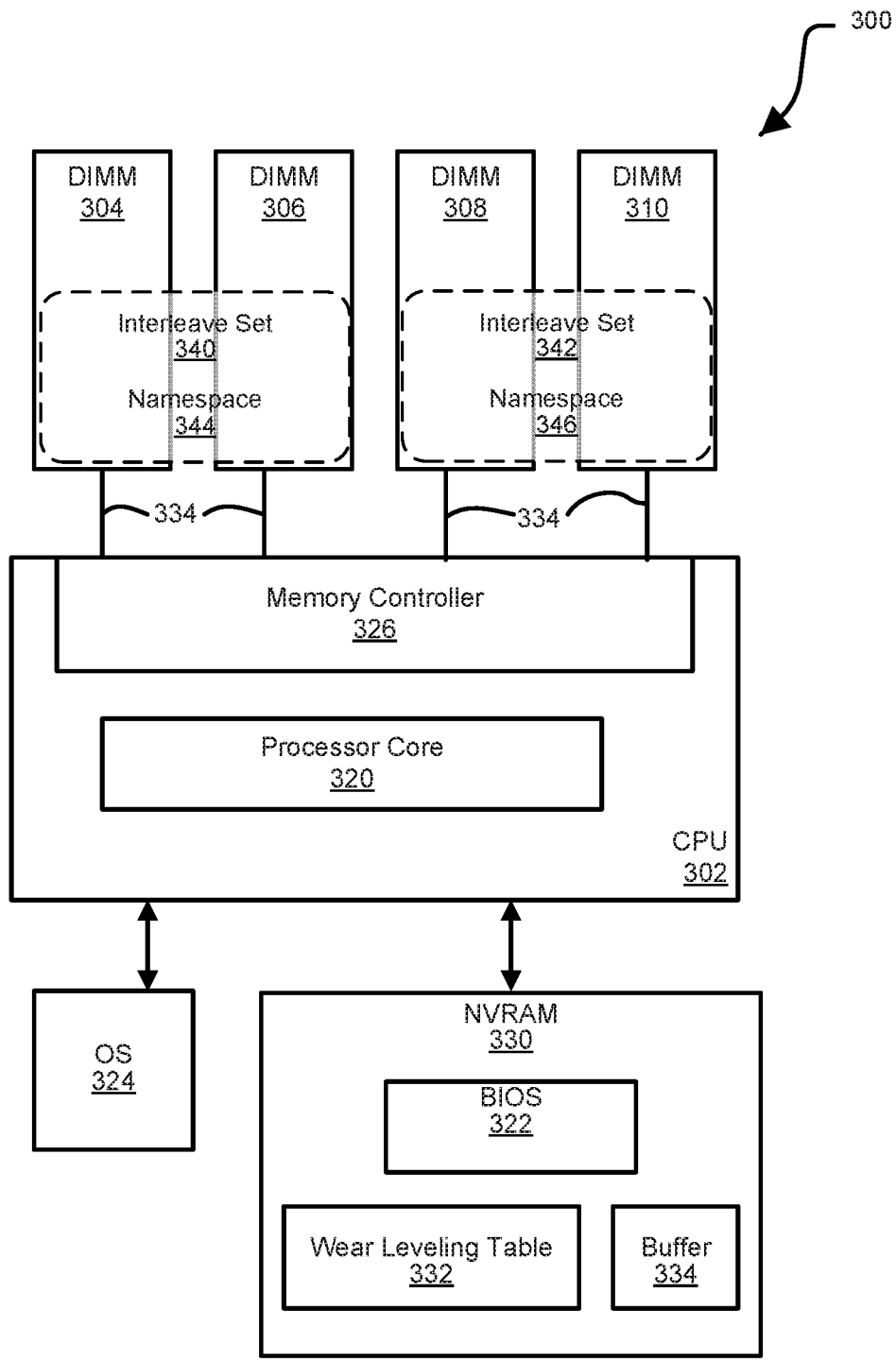
FIG. 3 is a block diagram of a portion of another information handling system according to at least one embodiment of the disclosure.

FIG. 3 illustrates a portion of an information handling system 300 including a CPU 302 and dual in-line memory modules (DIMMs) 304, 306, 308, and 310 (DIMMs 304-310). In an embodiment, information handling system 300 can be a server, a personal computer, a laptop computer, or the like, such as or substantially similar to information handling system 100 of FIG. 1. CPU 302 includes a processor core 320 and a memory controller 326. CPU 302 is in communication with a non-volatile random access memory (NVRAM) 330, which in turn may store a BIOS 322, a wear leveling table 332, and a buffer 334. CPU 302 may execute BIOS 322, and upon completion of the BIOS 322 may execute an OS 324. In an example, the BIOS 322 can be substantially compliant with one or more revisions of the UEFI specification. NVRAM 330 stores data associated with BIOS 322 within one or more tables including, but not limited to, the wear leveling table 332. In certain examples, information handling system 300 may include additional or fewer components, not shown in or discussed with reference to FIG. 3, without varying from the scope of this disclosure. For example, FIG. 3 illustrates DIMMs 304-310 installed within information handling system 300. However, depending on an implementation of information handling system 300, less or more DIMMs, such as 1 to 6 DIMMs, may be installed within information handling system 300 without varying from the scope of this disclosure.

In an example, DIMMs 304-310 may be configured in different memory modes, such as block mode and AppDirect mode. Data storage within DIMMs 304-310 may differ depending on the memory mode of DIMMs 304-310. For example, while in the AppDirect mode, multiple DIMMs, such as DIMMs 304 and 306, may be configured as an interleave set 340 so that the DIMMs 304 and 306 operate as a single storage device for the CPU 302. Similarly, DIMMs 308 and 310 may be configured as an interleave set 342 so that the DIMMs 308 and 310 operate as a single storage device for the CPU 302 separate from DIMMs 304 and 306. One of ordinary skill would recognize that this disclosure is not limited to interleave sets of only two DIMMs, but can be applied to an N-way interleave sets. However, for brevity and clarity the discussion herein will be described with respect to interleave set 340 with DIMMs 304 and 306 and interleave set 342 with DIMMs 308 and 310.

Each of DIMMs 304 and 306 within interleave set 340 include a label storage area (LSA), an unused portion, and a persistent memory namespace portion 344. The LSA portion can be utilized to store configuration metadata offsets, corresponding DIMM physical address (DPA) ranges within the flash DIMM, or the like. During the creation of the new interleave set, namespace from the previous interleave set is erased across the new interleave set of the persistent memory namespace portion 344 within the DIMMs 304 and 306. Upon the namespace successfully being created, metadata, DPA addresses, or the like are updated within the LSA portion of the flash DIMMs 304 and 306.

In an example, the flash memory within each DIMM 304-310 may have a fixed write endurance, which is a number of time that data may be written to the flash memory before the memory may wear out. In certain examples, upon the flash memory in one of DIMMs 304-310 wearing out, new data written to the DIMM may no longer be stored within the DIMM, such that data may be lost. In an example, one or more of DIMMs 304-310 may include memory locations storing data that is written back frequently, such that the flash memories within the DIMMs 304-310 may not wear out even. Thus, a percentage remaining of the write endurance may be monitored as will be described herein.

In an example, CPU 302 may separately communicate with each of the DIMMs 304-310 via one or more communication buses 334. In an embodiment, each communication bus 334, shown between CPU 302 and DIMM 304, 306, 308, or 310, may represent one or more different communication buses including, but not limited to, a System Management Bus (SMBus) and a Peripheral Component Interconnect (PCI).

Figure 4:
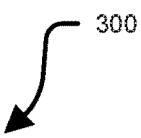
FIG. 4 is a table illustrating wear leveling for the information handling system of FIG. 3 according to at least one embodiment of the disclosure.

During a boot process of information handling system 300, BIOS 322 may create and/or update a wear leveling table 332 to store information associated with DIMMs 304-310. In an example, wear leveling table 332 may include any suitable data that may be utilized to improve data storage by CPU 302 within DIMMs 304-310. For example, as shown in FIG. 4, wear leveling table 332 may include a persistent memory device column 402, a memory mode column 404, a percentage remaining of a write endurance column 406, a slot location column 408, an interleave set column 410, and a namespace column 412. A description of BIOS 322 creating, updating, and utilizing wear leveling table 332 will be described with respect to FIGS. 3, 4, and 5.

During creation of wear leveling table 332, BIOS 322 create a separate line for each of DIMMs 304-310. For example, for persistent memory device 304, BIOS 322 may store AppDirect within the memory mode column 404, 4% within the percentage remaining column 406, slot 1 within slot location 408, interleave set 340 within interleave set column 410, and namespace 344 within namespace column 412. Similarly, for persistent memory device 306, BIOS 322 may store AppDirect within the memory mode column 404, 80% within the percentage remaining column 406, slot 2 within slot location 408, interleave set 340 within interleave set column 410, and namespace 344 within namespace column 412. With respect to persistent memory device 308, BIOS 322 may store AppDirect within the memory mode column 404, 100% within the percentage remaining column 406, slot 3 within slot location 408, interleave set 342 within interleave set column 410, and namespace 346 within namespace column 412. For persistent memory device 310, BIOS 322 may store AppDirect within the memory mode column 404, 100% within the percentage remaining column 406, slot 4 within slot location 408, interleave set 342 within interleave set column 410, and namespace 346 within namespace column 412.

During a boot process after the creation of wear leveling table 332, BIOS 322 may read a percentage remaining of write endurance for each of DIMMs 304-310, and update wear leveling table accordingly. In response to updating wear leveling table 332, BIOS 322 may determine the memory mode for DIMMs 304-310. In the example of FIG. 3, DIMMs 304-310 may be configured in AppDirect mode as shown in wear leveling table 332 illustrated in FIG. 4. Based on DIMMs 304-310 being in AppDirect mode, BIOS 322 may determine a persistent memory device with a lowest percentage remaining of write endurance, such as persistent memory device 304 that includes 4% write endurance remaining. BIOS 322 may determine all other persistent memory devices within the same interleave set, such as interleave set 340, as persistent memory device 304. Based on this determination, BIOS 322 may identify that persistent memory devices 304 and 306 are included within interleave set 340.

Figure 5:
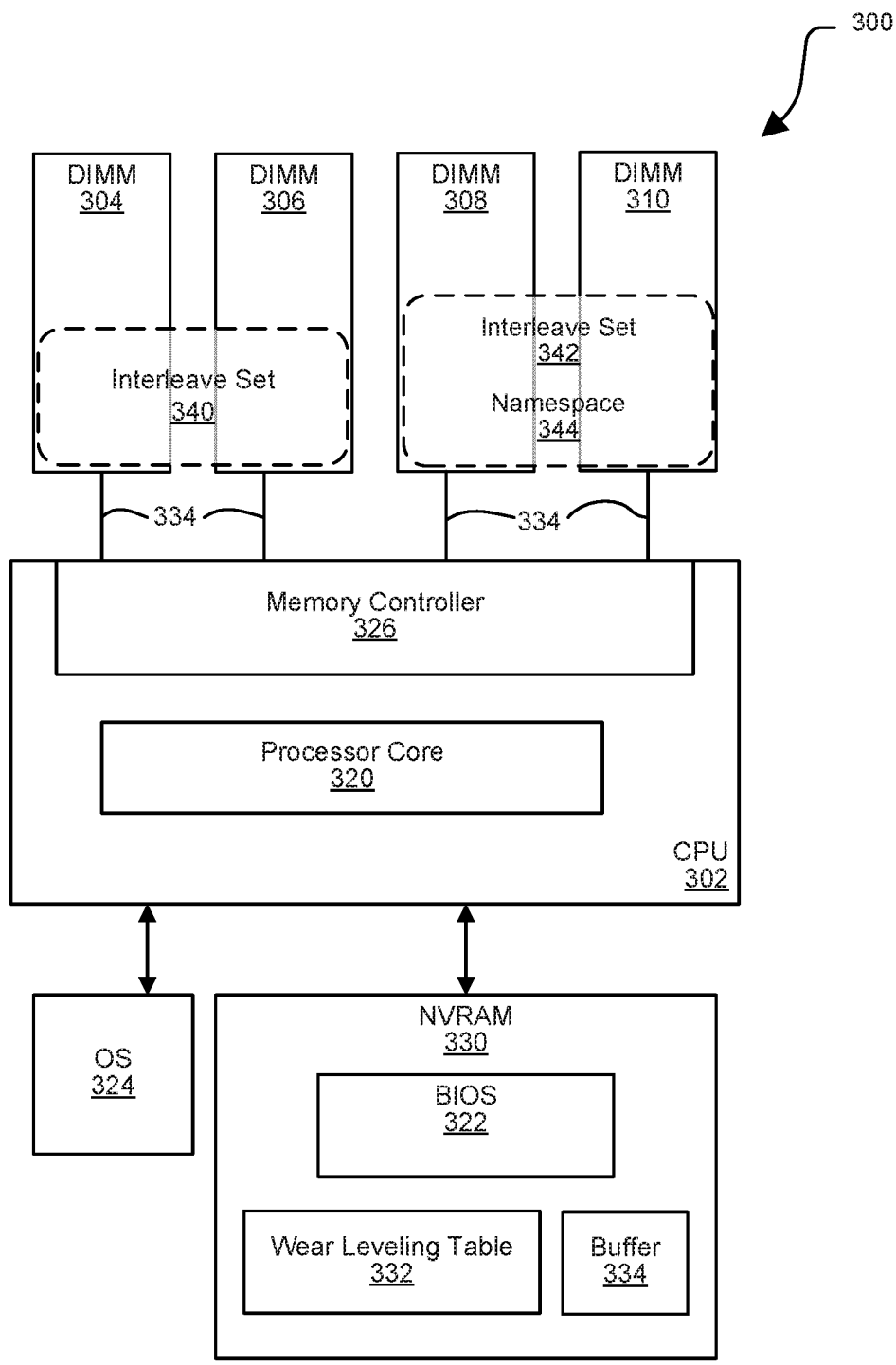
FIG. 5 is another block diagram of the information handling system from FIG. 3 according to at least one embodiment of the disclosure.

In an example, BIOS 322 may determine an interleave set, such as interleave set 342, that includes persistent memory devices, such as persistent memory device 308 and 310, with percentage remaining of write endurance higher than the percentage remaining of persistent memory device 304. BIOS 322 may determine that interleave set 342 includes the same number of persistent memory devices as interleave set 340 with the same amount of total memory capacity. In response interleave set 342 having an equal number of persistent memory devices and storage capacity, BIOS 322 may either automatically migrate all of the namespaces, such as namespace 344, from interleave set 340 to interleave set 342 as shown in FIG. 5, or may provide a warning message to an individual associated with information handling system 300. In an example, the warning message may indicate that the percentage remaining of the write endurance for interleave set 340 is low. In certain examples, the warning message may be provided to any suitable display device, including but not limited to, display device 1190 of FIG. 11. The warning message may also ask the individual to select one of three options: do nothing, swap namespaces/data between interleave set 340 and interleave set 342, and overwrite namespaces/data in interleave set 342 with namespaces/data from interleave set 340. In an example, if the individual selects the "do nothing" option the namespace 344 is left within interleave set 340.

If the individual selects swap namespaces/data or BIOS 322 is configured to automatically migrate the namespaces/data from interleave set 340 to interleave set 342, BIOS 322 may perform one or more operations to migrate data and namespace 334 in interleave set 340 to interleave set 342. For example, a portion of data in interleave set 340 is copied to buffer 334, and a portion of data is copied from interleave set 342 to interleave set 340. In an example, the portion of data copied from interleave set 342 may be the same size as the portion of data saved from interleave set 340 to buffer 334, such that no data is lost between interleave sets 340 and 342. Upon the portion of data from interleave set 342 being copied to interleave set 340, the data in buffer 334 is copied to interleave set 342. In an example, the data from buffer 334 may be copied to the location of interleave set 342 that the data copied from interleave set 342 to interleave set 340 was previously stored. In certain examples, BIOS 322 may continue these operations until all of the data within interleave set 340 is migrated or swapped with the data from interleave set 342.

If the individual selects overwrite data/namespace 346 in interleave set 342 with data/namespace 334 in interleave set 340, BIOS 322 may perform one or more operations to migrate data and namespace 334 in interleave set 340 to interleave set 342. For example, BIOS 322 may copy the data/namespace 344 from interleave set 340 to interleave set 342. In certain examples, BIOS 322 may either copy the data/namespace 344 directly from interleave set 340 to interleave set 342, or may first save the data/namespace 344 within buffer 334 before overwriting the data/namespace 346 in interleave set 342. Upon overwriting the data/namespace 346 in interleave set 342 with data/namespace 344 in interleave set 340, BIOS 322 may erase the data/namespace 344 from interleave set 340 as shown in FIG. 5.

Figure 6:
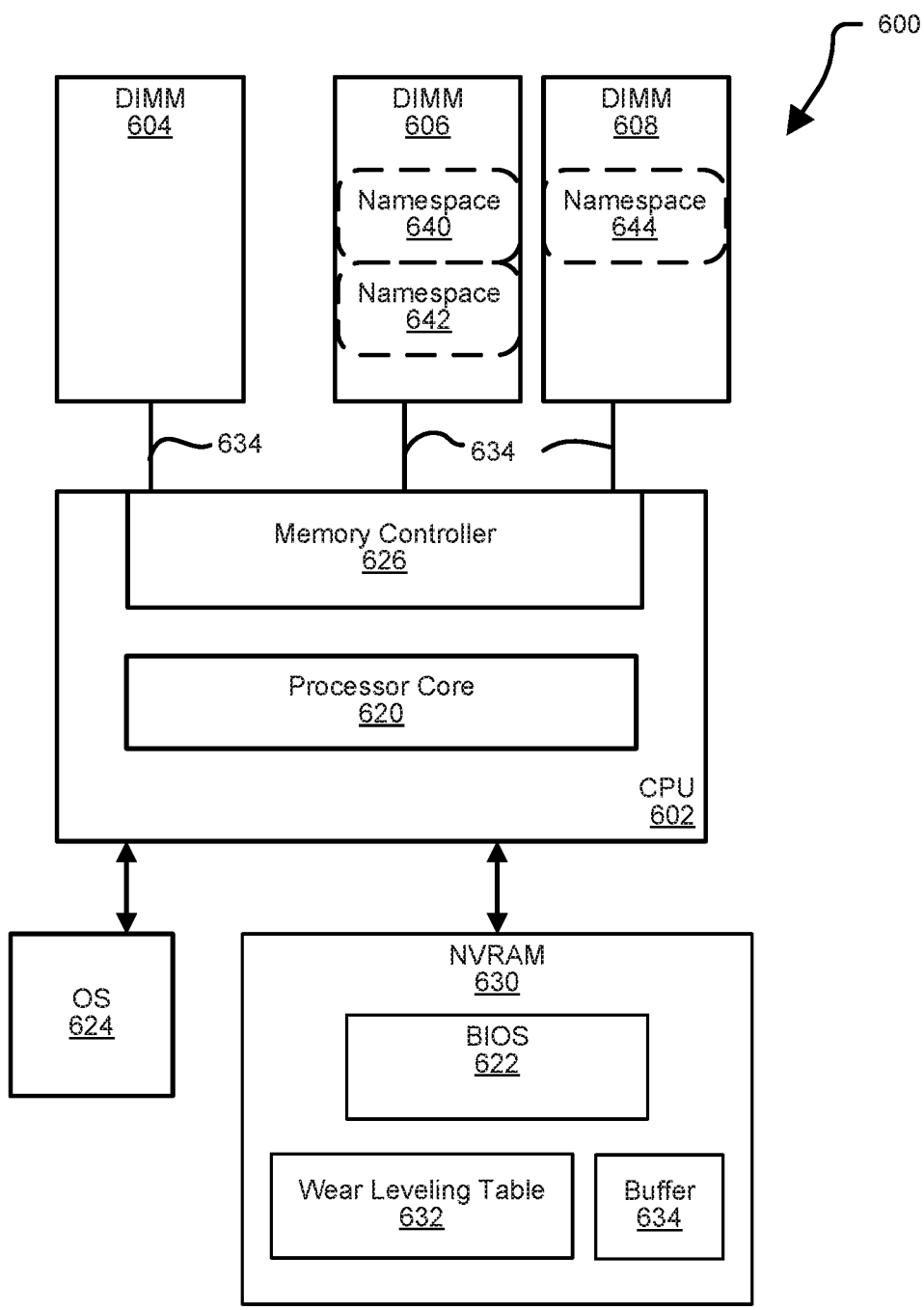
FIG. 6 is a block diagram of a portion of another information handling system according to at least one embodiment of the disclosure.

FIG. 6 illustrates a portion of an information handling system 600 including a CPU 602 and dual in-line memory modules (DIMMs) 604, 606, and 608 (DIMMs 604-608). In an embodiment, information handling system 600 can be a server, a personal computer, a laptop computer, or the like, such as or substantially similar to information handling system 100 of FIG. 1 and information handling system 300 of FIGS. 3 and 5. CPU 602 includes a processor core 620 and a memory controller 626. CPU 602 is in communication with a NVRAM 630, which in turn may store a BIOS 622, a wear leveling table 632, and a buffer 634. CPU 602 may execute BIOS 622, and upon completion of the BIOS 622 may execute an OS 624. In an example, the BIOS 622 can be substantially compliant with one or more revisions of the UEFI specification. NVRAM 630 stores data and drivers associated with BIOS 622 including, but not limited to, wear leveling table 632. In certain examples, information handling system 600 may include additional or fewer components, not shown in or discussed with reference to FIG. 6, without varying from the scope of this disclosure. For example, FIG. 6 illustrates DIMMs 604-608 installed within information handling system 600. However, depending on an implementation of information handling system 600, less or more DIMMs, such as 1 to 6 DIMMs, may be installed within information handling system 600 without varying from the scope of this disclosure.

In an example, DIMMs 604-608 may be configured in different memory modes, such as block mode and AppDirect mode. Data storage within DIMMs 604-608 may differ depending on the memory mode of DIMMs 604-608. In an example, while in the AppDirect, each DIMM 604-608 may be divided into one or more namespaces. For example, DIMM 606 may be divided into namespaces 640 and 642, and DIMM 608 may include namespace 644.

In an example, the flash memory within each DIMM 604-608 may have a fixed write endurance, which is a number of time that data may be written to the flash memory before the memory may wear out. In certain examples, upon the flash memory in one of DIMMs 604-608 wearing out, new data written to the DIMM may no longer be stored within the DIMM, such that data may be lost. In an example, one or more of DIMMs 604-608 may include memory locations storing data that is written back frequently, such that the flash memories within the DIMMs 604-608 may not wear out even. Thus, a percentage remaining of the write endurance may be monitored as will be described herein.

In an example, CPU 602 may separately communicate with each of the DIMMs 604-608 via one or more communication buses 634. In an embodiment, each communication bus 634, shown between CPU 602 and DIMM 604, 606, or 608, may represent one or more different communication buses including, but not limited to, a System Management Bus (SMBus) and a Peripheral Component Interconnect (PCI).

Figure 7:
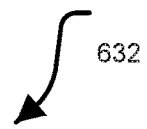
FIG. 7 is a table illustrating wear leveling for the information handling system of FIG. 6 according to at least one embodiment of the disclosure.

During a boot process of information handling system 600, BIOS 622 may create and/or update wear leveling table 632 to store information associated with DIMMs 604-608. In an example, wear leveling table 632 may include any suitable data that may be utilized to improve data storage by CPU 602 within DIMMs 604-608. For example, as shown in FIG. 7, wear leveling table 632 may include a persistent memory device column 702, a memory mode column 704, a percentage remaining of a write endurance column 706, a slot location column 708, an interleave set column 710, and a namespace column 712. A description of BIOS 622 creating, updating, and utilizing wear leveling table 632 will be described with respect to FIGS. 6, 7, and 8.

During creation of wear leveling table 632, BIOS 622 createS a separate line for each of DIMMs 604-608. For example, in persistent memory device 604, BIOS 622 may store AppDirect mode within the memory mode column 704, 100% within the percentage remaining column 706, slot 1 within slot location 708, no interleave set within interleave set column 710, and no namespace within namespace column 712. Similarly, for persistent memory device 606, BIOS 622 may store AppDirect mode within the memory mode column 704, 3% within the percentage remaining column 706, slot 2 within slot location 708, no interleave set within interleave set column 710, and namespaces 640 and 642 within namespace column 712. With respect to persistent memory device 608, BIOS 622 may store AppDirect mode within the memory mode column 704, 80% within the percentage remaining column 706, slot 3 within slot location 708, no interleave set within interleave set column 710, and namespace 644 within namespace column 712.

During a boot process after the creation of wear leveling table 632, BIOS 622 may read a percentage remaining of write endurance for each of DIMMs 604-608, and update wear leveling table 632 accordingly. In response to updating wear leveling table 632, BIOS 622 may determine the memory mode for DIMMs 604-608. In the example of FIG. 6, DIMMs 604-608 may be configured in AppDirect mode as shown in wear leveling table 632 illustrated in FIG. 7. Based on DIMMs 604-608 being in AppDirect mode, BIOS 622 may determine a persistent memory device with a percentage remaining of write endurance that satisfies a threshold, such as persistent memory device 606 that includes 3% write endurance remaining. In an example, percentage remaining of write endurance may satisfy the threshold based on the percentage remaining being below the threshold. In certain examples, the threshold may be any suitable percentage remaining including, but not limited to, 5%, 6%, 7%, 8%, 9%, and 10%.

In response to determining persistent memory device 606 has a percentage remaining that satisfies the threshold, BIOS 622 may determine another persistent memory device, such as persistent memory device 608, that includes a percentage remaining that is higher than the percentage remaining of persistent memory device 606. BIOS 622 may automatically migrate all of the data and namespaces, such as namespaces 640 and 642, from persistent memory device 606 to persistent memory device 608.

Additionally or alternatively, BIOS 622 may provide a warning message indicating that the percentage remaining of the write endurance for persistent memory device 606 is low. In certain examples, the warning message may be provided to any suitable display device, including but not limited to, display device 1190 of FIG. 11. The warning message may also ask the individual to select one of three options: do nothing, swap namespaces/data between persistent memory device 606 and persistent memory device 608, and overwrite namespaces/data in persistent memory device 608 with namespaces/data from persistent memory device 606. In an example, if the individual selects the "do nothing" option namespaces 640 and 642 are left within persistent memory device 606.

If the individual selects swap namespaces/data or BIOS 622 is configured to automatically migrate the data/namespaces 640 and 642 from persistent memory device 606 to persistent memory device 608, BIOS 622 may perform one or more operations to migrate data and namespaces 640 and 642 in persistent memory device 606 to persistent memory device 608. For example, a portion of data in persistent memory device 606 is copied to buffer 634, and a portion of data is copied from persistent memory device 608 to persistent memory device 606. In an example, the portion of data copied from persistent memory device 608 may be the same size as the portion of data saved from persistent memory device 606 to buffer 634, such that no data is lost between persistent memory devices 606 and 608. Upon the portion of data from persistent memory device 608 being copied to persistent memory device 606, the data in buffer 634 is copied to persistent memory device 608. In an example, the data from buffer 634 may be copied to the location of persistent memory device 608 that the data copied from persistent memory device 608 to persistent memory device 606 was previously stored. In certain examples, BIOS 622 may continue these operations until all of the data within persistent memory device 606 is migrated or swapped with the data from persistent memory device 606.

Figure 8:
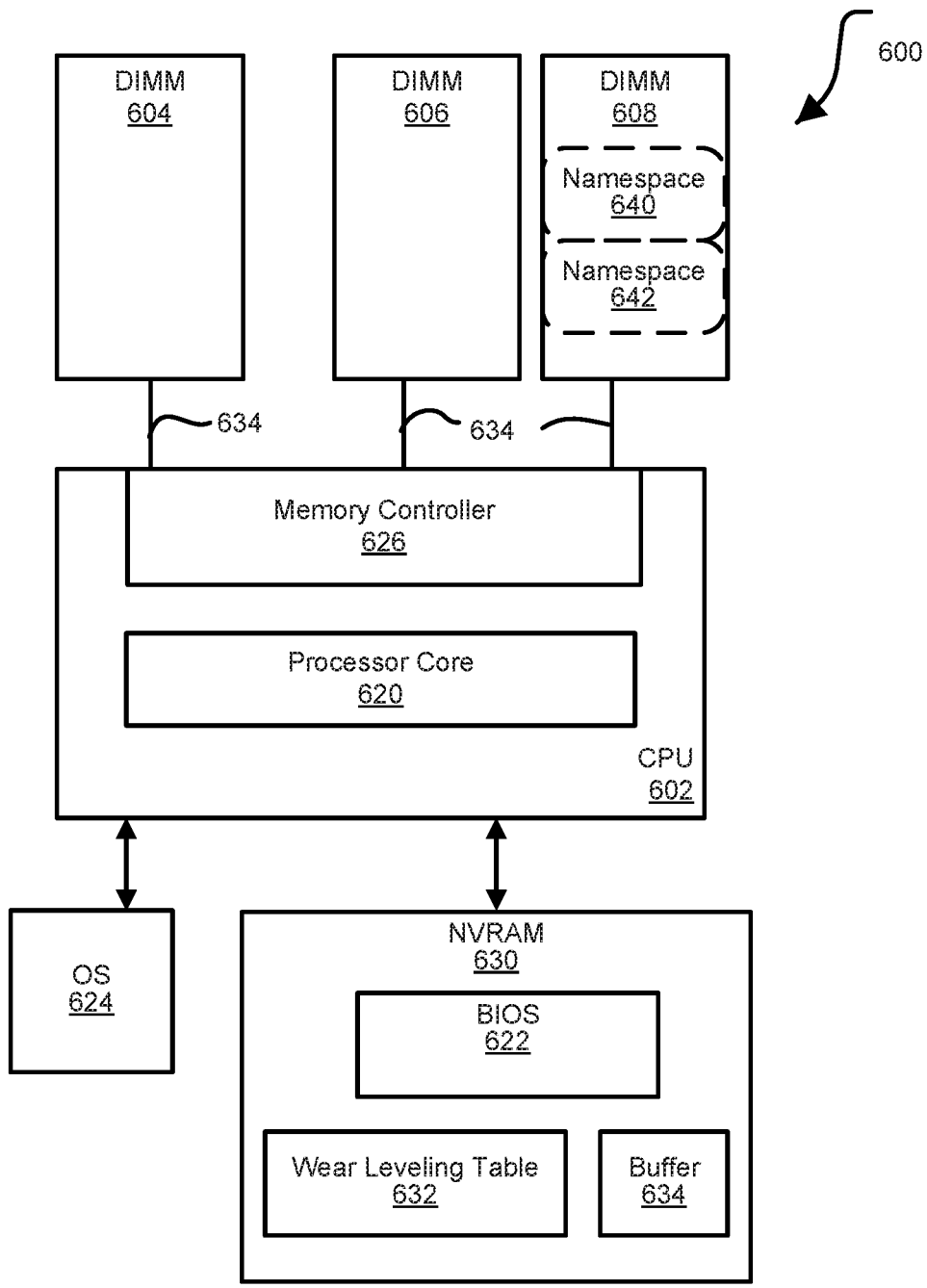
FIG. 8 is another block diagram of the information handling system from FIG. 6 according to at least one embodiment of the disclosure.

If the individual selects overwrite data/namespaces 640 and 642 in persistent memory device 606 with data/namespace 644 in interleave set 340, BIOS 322 may perform one or more operations to migrate data and namespaces 640 and 642 in persistent memory device 606 to persistent memory device 608. For example, BIOS 622 may copy the data/namespaces 640 and 642 from persistent memory device 606 to persistent memory device 608. In certain examples, BIOS 622 may either copy the data/namespaces 640 and 642 directly from persistent memory device 606 to persistent memory device 608, or may first save the data/namespaces 640 and 642 within buffer 634 before overwriting the data/namespace 644 in persistent memory device 608. Upon overwriting the data/namespace 644 in persistent memory device 608 with the data/namespaces 640 and 642 in persistent memory device 606, BIOS 622 may erase the data/namespaces 640 and 642 from persistent memory device 606 as shown in FIG. 8.

Based on the data/namespaces 640 and 642 being migrated from persistent memory device 606 to persistent memory device 608, memory controller 626 may perform one or more operations to route access requests to the correct persistent memory device. For example, memory controller 626 may remap access requests directed to persistent memory device 606 to persistent memory device 608, such that the access request is directed to the persistent memory device storing the data/namespaces 640 and 642. In an example, the access requests may be requests to read or write data to persistent memory device 606.

Figure 9:
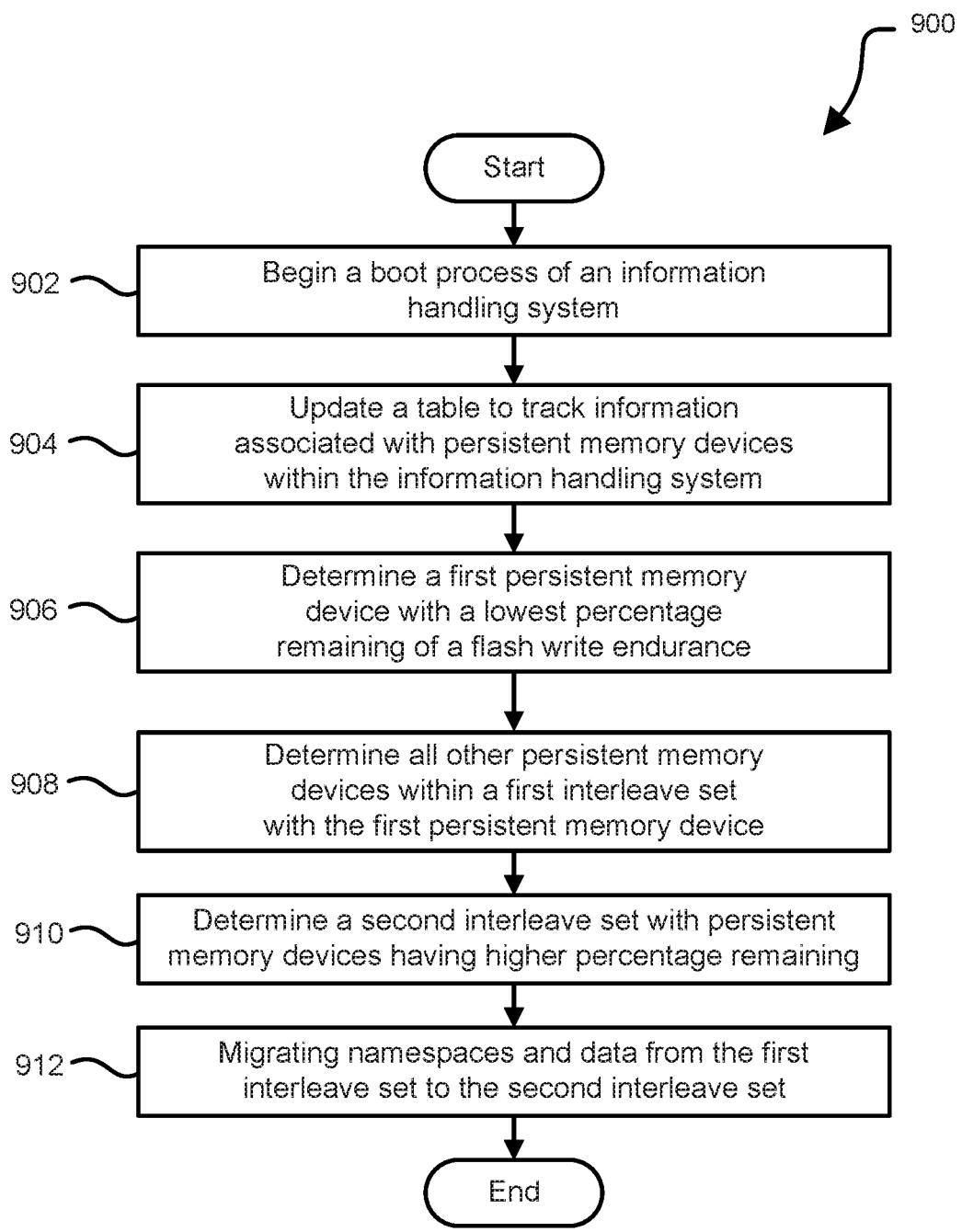
FIG. 9 is a flow diagram of a method for rotating persistent memories based on write endurance percent remaining according to at least one embodiment of the disclosure.

FIG. 9 is a flow diagram of a method 900 for booting to an operating system from a persistent memory device according to at least one embodiment of the disclosure. It will be readily appreciated that not every method step set forth in this flow diagram is always necessary, and that certain steps of the methods can be combined, performed simultaneously, in a different order, or perhaps omitted, without varying from the scope of the disclosure. In an embodiment, method 900 of FIG. 9 may be executed to enable interleave sets including persistent memory devices within sufficient percentage remaining of write endurance are utilized to store data within the information handling system so that no data is lost from a persistent memory device percentage remaining reaching zero.

At block 902, a boot process of an information handling system is begun. Block 902 may be performed in a manner described above. In an example, a BIOS of the information handling system may execute the boot process and perform one or more operations during the boot process, such as creating a wear leveling table. In certain examples, the wear leveling table may include information associated with each persistent memory device within the information handling system including, but not limited to, a memory mode, a percentage remaining of a write endurance, a slot location, an interleave set, and a namespace.

At block 904, a table is updated to track information associated with persistent memory devices within the information handling system. Block 904 may be performed in a manner described above. In an example, the table may be any suitable table, such as the wear leveling table. In certain examples, the updating of the table may include updating a percentage remaining of write endurance for each persistent memory devices within information handling system.

At block 906, a first persistent memory device with a lowest percentage remaining of the write endurance is determined. Block 906 may be performed in a manner described above. In an example, the determination is made in any suitable manner, including but not limited to, reading the percentage remaining for each persistent memory device from the wear leveling table.

At block 908, all other persistent memory devices within a first interleave set including the first persistent memory device are determined. Block 908 may be performed in a manner described above. In an example, the determination of other persistent memory devices within the first interleave set is made in any suitable manner, including but not limited to, reading the interleave sets of each persistent memory device from the wear leveling table.

At block 910, a second interleave set with persistent memory devices having a higher percentage remaining of write endurance is determined. Block 910 may be performed in a manner described above. In an example, a BIOS may determine that the second interleave set includes the same number of persistent memory devices as the first interleave set with the same amount of total memory capacity.

At block 912, namespaces and data are migrated from the first interleave set to the second interleave set. Block 912 may be performed in a manner described above. In an example, one or more operations may be performed to swap the data in the first interleave set and the data in the second interleave set. For example, a portion of data in the first interleave set is copied to a buffer, and a portion of data is copied from the second interleave set to the first interleave set. In an example, the portion of data copied from the second interleave set may be the same size as the portion of data saved from the first interleave set to the buffer, such that no data is lost between the two interleave sets. Upon the portion of data from the second interleave set being copied to the first interleave set, the data in the buffer is copied to the second interleave set. In an example, the data from the buffer may be copied to the location of the second interleave set that the data copied from the second interleave set to the first interleave set was previously stored. In certain examples, these operations may continue until all of the data of the first interleave set is swapped with the data from the second interleave set.

Figure 10:
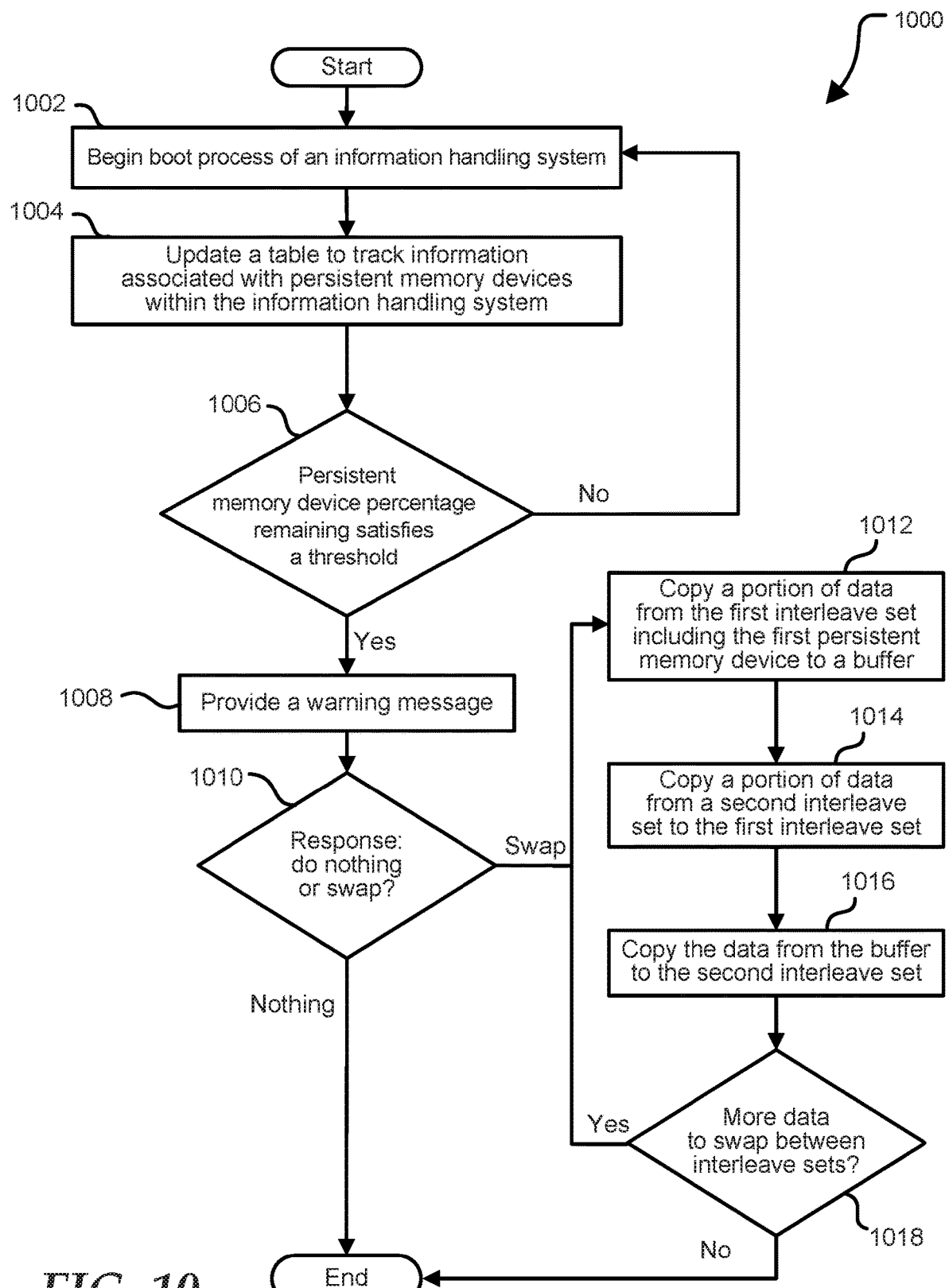
FIG. 10 is a flow diagram of another method for rotating persistent memories based on write endurance percent remaining according to at least one embodiment of the present disclosure.

FIG. 10 is a flow diagram of a method 1000 for booting to an operating system from a persistent memory device according to at least one embodiment of the disclosure. It will be readily appreciated that not every method step set forth in this flow diagram is always necessary, and that certain steps of the methods can be combined, performed simultaneously, in a different order, or perhaps omitted, without varying from the scope of the disclosure. In an embodiment, method 1000 of FIG. 10 may be executed to enable persistent memory devices within sufficient percentage remaining of write endurance are utilized to store data within the information handling system so that no data is lost from a persistent memory device percentage remaining reaching zero.

At block 1002, a boot process of an information handling system is begun. Block 1002 may be performed in a manner described above. In an example, a BIOS of the information handling system may execute the boot process and perform one or more operations during the boot process, such as creating a wear leveling table. In certain examples, the wear leveling table may include information associated with each persistent memory device within the information handling system including, but not limited to, a memory mode, a percentage remaining of a write endurance, a slot location, an interleave set, and a namespace.

At block 1004, a table is updated to track information associated with persistent memory devices within the information handling system. Block 1004 may be performed in a manner described above. In an example, the table may be any suitable table, such as the wear leveling table. In certain examples, the updating of the table may include updating a percentage remaining of write endurance for each persistent memory devices within information handling system.

At block 1006, a determination is made whether a persistent memory device includes a percentage remaining of a write endurance that satisfies a threshold. Block 1006 may be performed in a manner described above. In an example, the percentage remaining satisfies the threshold based on the percentage remaining being below the threshold. In certain examples, the determination is made in any suitable manner, including but not limited to, reading the percentage remaining for each persistent memory device from the wear leveling table. If no persistent memory device satisfies the threshold, the flow continues as stated above at block 1002 during a next boot process.

If a first persistent memory device has a percentage remaining that satisfies the threshold, a warning message is provided at block 1008. Block 1008 may be performed in a manner described above. In an example, the warning message may indicate that the first persistent memory device has a write endurance percentage that is low, and ask an individual is whether to do nothing or swap data between the first interleave set and a second interleave set.

At block 1010 a determination is made whether the individual selected to do nothing or to swap data between the interleave sets. Block 1010 may be performed in a manner described above. If the individual selected to do nothing, the flow ends. However, if the individual selected swap data between the interleave sets, the flow continues at block 1012.

At block 1012, a portion of data from the first persistent memory device is copied to a buffer. Block 1012 may be performed in a manner described above. In an example, the portion of data may be any suitable size and the buffer may be sufficiently large to store the portion of data.

At block 1014, a portion of data is copied from the second interleave set to the first interleave set. Block 1014 may be performed in a manner described above. In an example, the portion of data from the second interleave set may substantially the same size as the portion of data from the first interleave set. The portions may be the same size so that no data is lost within the first interleave set when the data from the second interleave set is stored within the first interleave set. In an example, the data from the second interleave set may be stored in a location of the first interleave set that data copied to the buffer was previously stored.

At block 1016, the portion of data in the buffer is copied to the second interleave set. Block 1016 may be performed in a manner described above. In an example, the data from the buffer may be stored in a location of the second interleave set that data copied to the first interleave set was previously stored.

At block 1018 a determination is made whether data is left to be swapped between the interleave sets. Block 1018 may be performed in a manner described above. In an example, if data is left to be swapped between the interleave sets, the flow continues at block 1012. Otherwise, the flow ends.

Figure 11:
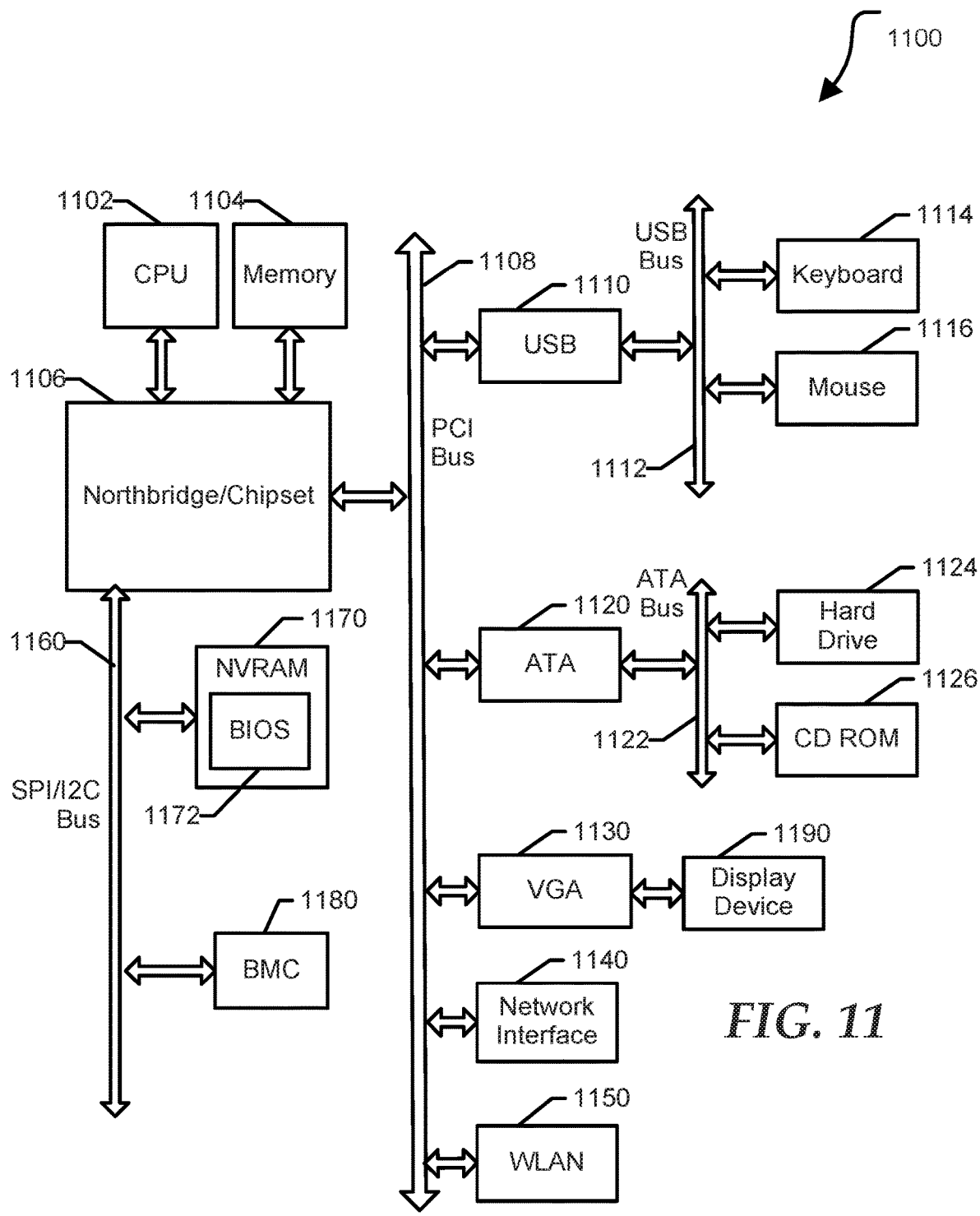
FIG. 11 is a block diagram of a general information handling system according to an embodiment of the present disclosure.

FIG. 11 illustrates a general information handling system 1100 including a processor 1102, a memory 1104, a northbridge/chipset 1106, a PCI bus 1108, a universal serial bus (USB) controller 1110, a USB 1112, a keyboard device controller 1114, a mouse device controller 1116, a configuration an ATA bus controller 1120, an ATA bus 1122, a hard drive device controller 1124, a compact disk read only memory (CD ROM) device controller 1126, a video graphics array (VGA) device controller 1130, a network interface controller (NIC) 1140, a wireless local area network (WLAN) controller 1150, a serial peripheral interface (SPI) bus 1160, a NVRAM 1170 for storing BIOS 1172, and a baseboard management controller (BMC) 1180. In an embodiment, information handling system 1100 may be information handling system 100 of FIG. 1, information handling system 300 of FIGS. 3 and 5, and/or information handling system 600 of FIGS. 6 and 8. BMC 1180 can be referred to as a service processor or embedded controller (EC). Capabilities and functions provided by BMC 1180 can vary considerably based on the type of information handling system. For example, the term baseboard management system is often used to describe an embedded processor included at a server, while an embedded controller is more likely to be found in a consumer-level device. As disclosed herein, BMC 1180 represents a processing device different from CPU 1102, which provides various management functions for information handling system 1100. For example, an embedded controller may be responsible for power management, cooling management, and the like. An embedded controller included at a data storage system can be referred to as a storage enclosure processor.

For purpose of this disclosure information handling system 1100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 1100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 1100 can include processing resources for executing machine-executable code, such as CPU 1102, a programmable logic array (PLA), an embedded device such as a System-on-a-Chip (SoC), or other control logic hardware. Information handling system 1100 can also include one or more computer-readable medium for storing machine-executable code, such as software or data.

System 1100 can include additional processors that are configured to provide localized or specific control functions, such as a battery management controller. Bus 1160 can include one or more busses, including a SPI bus, an I2C bus, a system management bus (SMBUS), a power management bus (PMBUS), and the like. BMC 1180 can be configured to provide out-of-band access to devices at information handling system 1100. As used herein, out-of-band access herein refers to operations performed prior to execution of BIOS 1172 by processor 1102 to initialize operation of system 1100.

BIOS 1172 can be referred to as a firmware image, and the term BIOS is herein used interchangeably with the term firmware image, or simply firmware. BIOS 1172 includes instructions executable by CPU 1102 to initialize and test the hardware components of system 1100, and to load a boot loader or an operating system (OS) from a mass storage device. BIOS 1172 additionally provides an abstraction layer for the hardware, such as a consistent way for application programs and operating systems to interact with the keyboard, display, and other input/output devices. When power is first applied to information handling system 1100, the system begins a sequence of initialization procedures. During the initialization sequence, also referred to as a boot sequence, components of system 1100 are configured and enabled for operation, and device drivers can be installed. Device drivers provide an interface through which other components of the system 1100 can communicate with a corresponding device.

Information handling system 1100 can include additional components and additional busses, not shown for clarity. For example, system 1100 can include multiple processor cores, audio devices, and the like. While a particular arrangement of bus technologies and interconnections is illustrated for the purpose of example, one of skill will appreciate that the techniques disclosed herein are applicable to other system architectures. System 1100 can include multiple CPUs and redundant bus controllers. One or more components can be integrated together. For example, portions of northbridge/chipset 1106 can be integrated within CPU 1102. Additional components of information handling system 1100 can include one or more storage devices that can store machine-executable code, one or more communications ports for communicating with external devices, and various input and output (I/O) devices, such as a keyboard, a mouse, and a video display. For example, device controller 1130 may provide data to a display device 1190 to visually present the information to an individual associated with information handling system 1100. An example of information handling system 1100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 1100 can include a set of instructions that can be executed to cause the information handling system to perform any one or more of the methods or computer based functions disclosed herein. The information handling system 1100 may operate as a standalone device or may be connected to other computer systems or peripheral devices, such as by a network.

In a networked deployment, the information handling system 1100 may operate in the capacity of a server or as a client user computer in a server-client user network environment, or as a peer computer system in a peer-to-peer (or distributed) network environment. The information handling system 1100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1100 can be implemented using electronic devices that provide voice, video or data communication. Further, while a single information handling system 1100 is illustrated, the term "system" shall also be taken to include any collection of systems or sub-systems that individually or jointly execute a set, or multiple sets, of instructions to perform one or more computer functions.

The information handling system 1100 can include a disk drive unit and may include a computer-readable medium, not shown in FIG. 11, in which one or more sets of instructions, such as software, can be embedded. Further, the instructions may embody one or more of the methods or logic as described herein. In a particular embodiment, the instructions may reside completely, or at least partially, within system memory 1104 or another memory included at system 1100, and/or within the processor 1102 during execution by the information handling system 1100. The system memory 1104 and the processor 1102 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   reading, by a basic input/output system (BIOS) of an information handling system, a percentage remaining of a flash write endurance of each of a plurality of persistent memory devices, including a first percentage remaining of a first persistent memory device and a second percentage remaining of a second persistent memory device;
   determining, by the BIOS, whether the first percentage remaining of the first persistent memory device satisfies a threshold percentage;
   determining, by the BIOS, whether the second percentage remaining of the second persistent memory device satisfies the threshold percentage;

in response to the first percentage remaining of the first persistent memory device satisfying the threshold percentage and the second percentage remaining of the second persistent memory device not satisfying the threshold percentage, providing a message with a plurality of options including do nothing, swap namespaces between memory devices, and overwrite namespaces in the second persistent memory device with namespaces from the first persistent memory device;

in response to receiving a selection of overwrite the namespaces in the second persistent memory device with the namespaces from the first persistent memory device, overwriting the namespaces within the second persistent memory device with the namespaces from the first persistent memory device; and providing, by the BIOS, a first message recommending that the first persistent memory device be replaced.

2. The method of claim 1, further comprising:
generating a table to store information associated with the persistent memory devices; and
during a boot process of the information handling system, updating, by the BIOS, the information in the table to include a current percentage remaining for each of the persistent memory devices.

3. The method of claim 2, wherein the information for each persistent memory device includes a memory mode, percent remaining, a slot location, an interleave set, and namespace information.

4. The method of claim 1, further comprising:
in response to the persistent memory devices being configured in a AppDirect mode:
determining persistent memory devices in a first interleave set with the first persistent memory device;
determining a second interleave set with an equal number of persistent memory devices and with a same amount of total memory capacity as the first interleave set; and
recommending swapping persistent memory devices between the first interleave set and the second interleave set.

5. The method of claim 4, further comprising:
performing a backup of data in both the first interleave set and the second interleave set;
performing a backup of namespaces of both the first interleave set and the second interleave set; and
swapping the persistent memory devices between the first interleave set and the second interleave set.

6. The method of claim 5, further comprising:
recreating the namespaces of the first interleave set and the second interleave set; and
restoring the data in the persistent memory devices of the first interleave set and the second interleave set.

7. The method of claim 1, further comprising:
remapping, by a memory controller of the information handling system, an access request from the first persistent memory device to the second persistent memory device,
wherein the access request is to read or write data to the first persistent memory device.

8. The method of claim 1, wherein the second persistent memory device is a new persistent memory device of the information handling system.

9. An information handling system comprising:
a plurality of persistent memory devices including first and second persistent memory devices; and a basic input/output system (BIOS) that during a power-on self-test (POST) of the information handling system:
reads a percentage remaining of a flash write endurance of each of the persistent memory devices, including a first percentage remaining of the first persistent memory device and a second percentage remaining of the second persistent memory device; determines whether the first percentage remaining of the first persistent memory device satisfies a threshold percentage;
determines whether the second percentage remaining of the second persistent memory device satisfies the threshold percentage; in response to the first percentage remaining of the first persistent memory device satisfying the threshold percentage and the second percentage remaining of the second persistent memory device not satisfying the threshold percentage, providing a message with a plurality of options including do nothing, swap namespaces between memory devices, and overwrite namespaces in the second persistent memory device with namespaces from the first persistent memory device; in response to receiving a selection of overwrite the namespaces in the second persistent memory device with the namespaces from the first persistent memory device, overwrites the namespaces within the second persistent memory device with the namespaces from the first persistent memory device; and provides a first message recommending that the first persistent memory device be replaced.

10. The information handling system of claim 9, wherein the BIOS further: generates a table to store information associated with the persistent memory devices; and during a boot process of the information handling system, updates the information in the table to include a current percentage remaining for each of the persistent memory devices.

11. The information handling system of claim 10, wherein the information for each persistent memory device includes a memory mode, percent remaining, a slot location, an interleave set, and namespace information.

12. The information handling system of claim 9, in response to the persistent memory devices being configured in a AppDirect mode: the BIOS determines persistent memory devices in a first interleave set with the first persistent memory device, determines a second interleave set with an equal number of persistent memory devices and with a same amount of total memory capacity as the first interleave set, and recommends swapping persistent memory devices between the first interleave set and the second interleave set.

13. The information handling system of claim 12, the BIOS further: performs a backup of data in both the first interleave set and the second interleave set, performs a backup of namespaces of both the first interleave set and the second interleave set; and swaps the persistent memory devices between the first interleave set and the second interleave set.

14. The information handling system of claim 13, the BIOS further: recreates the namespaces of the first interleave set and the second interleave set; and restores the data in the persistent memory devices of the first interleave set and the second interleave set.

15. The information handling system of claim 9, further comprising:
a memory controller in communication with the persistent memory devices, the memory controller remaps an access request from the first persistent memory device to the second persistent memory device, wherein the access request is to read or write data to the first persistent memory device.

16. The information handling system of claim 9, wherein the first persistent memory device is replaced with a new persistent memory device of the information handling system.

17. A method comprising:
reading, by a basic input/output system (BIOS) of an information handling system, a percentage remaining of a flash write endurance of each of a plurality of persistent memory devices, including a first percentage remaining of the flash write endurance of a first persistent memory device;
determining, by the BIOS, all persistent memory devices in a first interleave set with the first persistent memory device;
determining, by the BIOS, that each percentage remaining of the flash write endurance of at least one persistent memory device within the first interleave set does not exceed the first percentage remaining of the flash write endurance of the first persistent memory device;
determining a second interleave set with an equal number of persistent memory devices and with a same amount of total memory capacity as the first interleave set;
determining each percentage remaining of the flash write endurance of each persistent memory device within the second interleave set exceeds the first percentage remaining of the flash write endurance of the first persistent memory device;
in response to the percentage remaining of the flash write endurance of the at least one persistent memory device within the first interleave set not exceeding the first percentage remaining of the flash write endurance of the first persistent memory device, and in response to each percentage remaining of the flash write endurance of each persistent memory device within the second interleave set exceeding the first percentage remaining of the flash write endurance of the first persistent memory device, providing a message with a plurality of options including do nothing, swap namespaces between memory devices, and overwrite namespaces in the second persistent memory device with namespaces from the first persistent memory device;
in response to receiving a selection of overwrite the namespaces in the second interleave set with the namespaces from the first interleave set, overwriting all namespaces in the second interleave set with the namespaces from the first interleave set; and
erasing the namespaces from the first interleave set.

18. The method of claim 17, further comprising:
generating a table to store information associated with the persistent memory devices; and
during a boot process of the information handling system, updating, by the BIOS, the information in the table to include a current percentage remaining for each of the persistent memory devices.

19. The method of claim 18, wherein the information for each persistent memory device includes a memory mode, percent remaining, a slot location, an interleave set, and namespace information.

20. The method of claim 19, further comprising:
determining, by the BIOS, whether the first percentage remaining satisfies a threshold percentage; and
in response to the first percentage remaining satisfying the threshold percentage, providing, by the BIOS, a first message recommending that the first persistent memory device is replaced with the second persistent memory device, wherein the second percentage remaining of the flash write endurance does not satisfy the threshold percentage.

* * * * *